US007311251B1

(12) United States Patent
White

(10) Patent No.: US 7,311,251 B1
(45) Date of Patent: Dec. 25, 2007

(54) SYSTEM AND METHOD OF COMPLETING A TRANSACTION INVOLVING GOODS TAGGED WITH RFID LABELS

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 258 days.

(21) Appl. No.: 11/173,843

(22) Filed: Jul. 1, 2005

(51) Int. Cl.
*G06K 7/10* (2006.01)

(52) U.S. Cl. .................................. 235/383; 235/462.01

(58) Field of Classification Search ................ 235/383, 235/492, 486, 379, 380, 382, 382.5; 705/10, 705/14, 28
See application file for complete search history.

(56) References Cited

U.S. PATENT DOCUMENTS 6,659,344 B2 * 12/2003 Otto et al. .................. 235/381
2002/0038267 A1 * 3/2002 Can et al. ...................... 705/28
2004/0195334 A1 * 10/2004 Silverbrook et al. ... 235/462.14
2006/0097467 A1 * 5/2006 Solomon et al. ....... 280/33.992
2006/0266828 A1 * 11/2006 Silverbrook et al. ........ 235/385
2007/0008068 A1 * 1/2007 Brice et al. ................ 340/5.91
2007/0063028 A1 * 3/2007 Byerley ...................... 235/383

* cited by examiner

*Primary Examiner*—Thien Minh Le
(74) *Attorney, Agent, or Firm*—Paul W. Martin

(57) ABSTRACT

A system and method of completing a transaction involving goods tagged with radio frequency identification (RFID) labels which uses a portal to read the RFID labels. The system includes a computer for obtaining label information read from radio frequency identification labels on products selected for purchase by a customer by a plurality of radio frequency identification label readers in a portal, for storing the label information with an identifier associating the customer with the label information in a transaction record, and for providing the label information to a transaction terminal so that the transaction terminal can determine prices associated with the products and process customer payment for the products.

16 Claims, 2 Drawing Sheets

SYSTEM AND METHOD OF COMPLETING A TRANSACTION INVOLVING GOODS TAGGED WITH RFID LABELS

BACKGROUND

RFID technology provides an alternative to bar code reader technology for distinguishing and recording items for purchase. RFID may result in labor savings to retailers, since it may obsolete conventional methods of identifying products.

It would be desirable to provide a system and method of completing a transaction involving goods tagged with RFID labels.

SUMMARY

A system and method of completing a transaction involving goods tagged with radio frequency identification (RFID) labels is provided.

The system includes a computer for obtaining label information read from radio frequency identification labels on products selected for purchase by a customer by a plurality of radio frequency identification label readers in a portal, for storing the label information with an identifier associating the customer with the label information in a transaction record, and for providing the label information to a transaction terminal so that the transaction terminal can determine prices associated with the products and process customer payment for the products.

DETAILED DESCRIPTION

Figure 1:
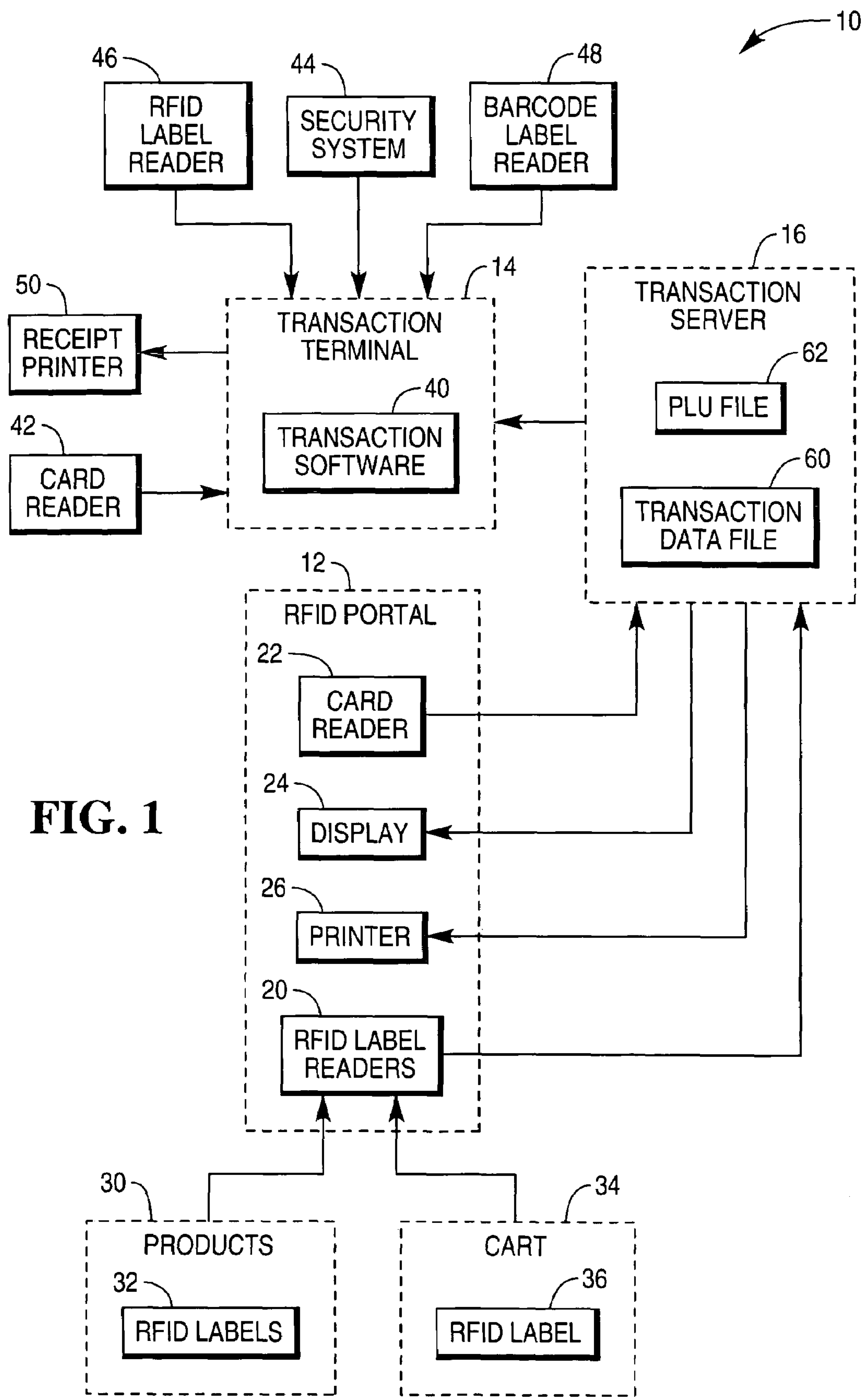
FIG. 1 is a block diagram of a transaction processing system.

Referring now to FIG. 1, transaction system 10 primarily includes radio frequency identification (RFID) portal 12 and a plurality of transaction terminals 14.

RFID portal 12 includes RFID label readers 20, and may optionally include card reader 22, display 24, and printer 26.

RFID label readers 20 read RFID labels 32 on products 30. RFID label readers 20 emit signals and receiving return signals from RFID labels 32. RFID label readers 20 may also read an RFID label 36 on shopping cart 34, if one is present.

RFID label readers 20 may be network peripherals and may be connected to transaction server 16 or some other computer, such as one of transaction terminals 14. Information read from RFID labels 32 by RFID label readers 20 may be stored in transaction data file 60 by transaction server 16.

RFID labels 32 store product identification information, typically a serial number only, but may additionally store other information.

RFID portal 12 may take a variety of possible shapes. For example, RFID portal 12 may resemble an inverted U shape, with RFID label readers 20 being arranged all around the U-shape RFID portal 12, for increasing chances of successfully reading RFID labels 32 as shopping cart 34 passes through RFID portal 12. Establishing a minimum clearance between carts reduces the risk of reading RFID labels 32 of other customers.

Transaction terminals 14 execute transaction software 40 for completing payment for products 30.

The ratio of transaction terminals 14 to RFID portals 12 may vary, depending on store need and desire to minimize, or avoid altogether, waiting lines and bottlenecks during payment and security checks. Some stores may be able to have a single RFID portal 12 with eight to twelve transaction terminals 14. Others may be able to go as high as about sixteen transaction terminals 14 for each RFID portal 12 with minimal concern for under utilization or cost of excess transaction terminals 14.

Transaction software 40 first determines product information associated with a customer. Under one embodiment, transaction server 16 may direct a customer to a particular transaction terminal 14 following reading of RFID labels 32. Transaction server 16 may provide an indication by displaying a terminal number through display 24 or print a ticket through printer 26, which may include network peripherals. Transaction server 16 stores the terminal number and optionally a time with transaction data 60. During checkout, transaction software 40 looks up its assigned terminal number to find the most recent corresponding product information.

Alternatively, if cart 34 is equipped with RFID label 36, transaction server 16 may obtain cart identification information through RFID label readers 20 and store the cart identification information in transaction data file 60 with product information obtained by RFID label readers 20. During checkout, transaction software 40 obtains cart identification information through RFID label reader 46 at transaction terminal 14, looks up the cart identification information in transaction data file 60, and obtains the corresponding product information from transaction data file 60.

Alternatively, if RFID portal is equipped with card reader 22, transaction server 16 may read customer identification information from a customer loyalty card and store the customer identification information with product identification information read by RFID label readers 20 in transaction data file 60. During checkout, transaction software 40 obtains the customer identification information through card reader 42 at transaction terminal 14, looks up the customer identification information in transaction data file 60, and obtains the corresponding product information from transaction data file 60.

Other identifiers of product information are also envisioned, such as a time entering, leaving, or while in RFID portal 12. Transaction server 16 may store any of the other identifiers in transaction data file 60. Transaction server 16 may display or print the identifiers.

In order to determine whether all products 30 were identified by RFID portal 12, transaction software 40 receives additional information about products 30 from security system 44. For example, security system 44 may include a scale for weighing products 30 and cart 34. Transaction software 40 determines the weights of identified products 30 from PLU file 62 and compares the total weight of products 30 with measured weight less cart weight. Other technologies may provide a count of the number of products 30 in cart 34 and the location of an unidentified product.

If transaction software 40 determines that one or more products 30 were not successfully identified by RFID portal 12, transaction software 40 may reprocess all of products 30 in cart 34 or process only the unidentified products 30. RFID label reader 46 may be used to attempt to read RFID labels 32 on unprocessed products 30, or if products 30 also have barcode labels, barcode label reader 48 may be used to process products 30. If reprocessing is necessary, other customers waiting in line may be routed to other transaction terminals 14 following passage through RFID portal 12.

Transaction software 40 determines price information associated with the product information from price look-up (PLU) file 62.

Customers may complete payment in any conventional manner, cash, charge, debit, or otherwise using corresponding peripherals. For example, each of transaction terminals 14 includes card reader 42 for completing payment by card. Receipt printer 50 prints a receipt.

Transaction server 16 controls operation of RFID portal 12. Alternatively, a different computer or one of transaction terminals 14 may control operation of RFID portal 12. Transaction server 16 stores PLU file 62. Transaction server 16 may also store transaction data file 60.

Figure 2:
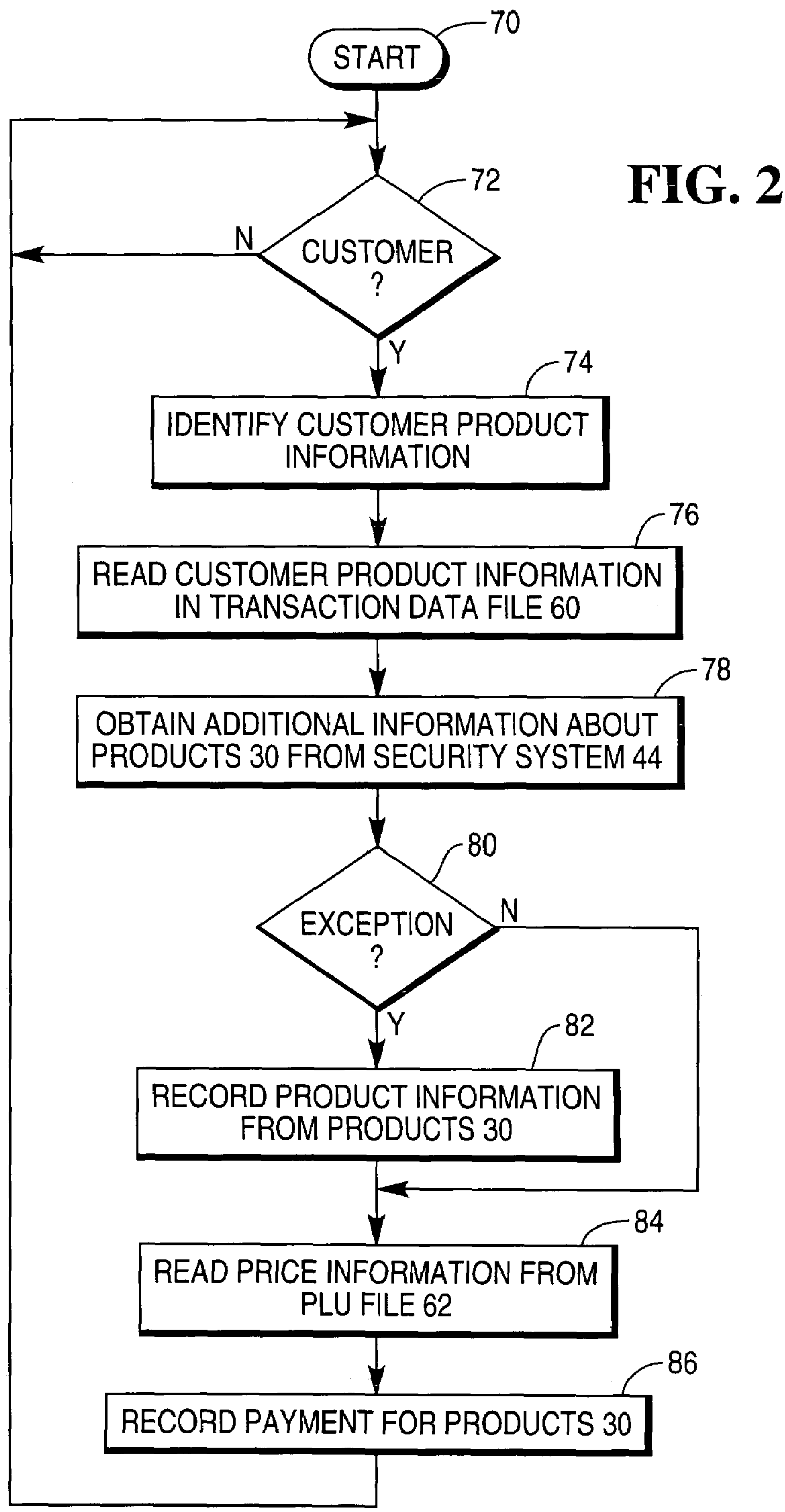
FIG. 2 is a flow diagram illustrating the method of the present invention.

In FIG. 2, the method of operation of transaction software 40 is illustrated in more detail beginning with START 70.

In step 72, transaction software 40 waits for a customer. Transaction server 16 may assign customers to transaction terminals 14 or customers may choose any open transaction terminal 14. Operation proceeds to step 74.

In step 74, transaction software 40 identifies product information associated with purchased products 30 of the customer in transaction data file 60. If transaction server 16 has assigned transaction terminals 14, transaction software 40 looks up its assigned terminal number to find the most recent corresponding product information. If customers choose any open lane, transaction software 40 obtains customer identification information, cart identification information, or other identifier to obtain corresponding product information from transaction data file 60.

In step 76, transaction software 40 reads customer product information in transaction data file 60. Transaction software 40 uses the identifier obtained in step 74 to look up associated the corresponding customer product information.

In step 78, transaction software 40 obtains additional information about products 30 from security system 44. If the additional information is weight information, transaction software 40 obtains reference weight information from PLU file 62 and compares the sum of the reference weight information to the recorded weight information from security system 44.

In step 80, transaction software 40 determines whether exceptions exist. If so, operation continues to step 82. Otherwise, operation proceeds to step 84.

In step 82, transaction software 40 records product information from products 30 using RFID label reader 46, or barcode label reader 48 if barcode labels are available. Other customers may choose or be routed to other transaction terminals 14 while exceptions are being processed.

In step 84, transaction software 40 reads price information from PLU file 62 using the product identification information.

In step 86, transaction software 40 records payment for products 30 through any conventional manner, including payment by cash, or by card through card reader 42, and issues a receipt from receipt printer 50. Operation returns to step 72 to wait for another customer that has exited RFID portal 12.

Although particular reference has been made to certain embodiments, variations and modifications are also envisioned within the spirit and scope of the following claims.

The invention claimed is:

1. A transaction system comprising:

a stationary radio frequency identification portal, including a plurality of readers for reading radio frequency identification labels on products selected for purchase by a customer and moved through the portal, wherein the readers are arranged in different positions to read the radio frequency identification labels from different angles;

a storage medium for storing label information from the radio frequency identification labels read by the radio frequency identification label readers; and a transaction terminal for determining that the label information is associated with the customer, for obtaining the label information from the storage medium, for determining prices associated with the products using the label information, and for processing customer payment for the products.

2. The system of claim 1, further comprising:

a security system coupled to the transaction terminal for determining whether the radio frequency identification labels have all been read.

3. The system of claim 1, wherein the transaction terminal includes a card reader, and wherein the transaction terminal determines that the label information is associated with the customer by reading identification information from a card of the customer using the card reader, and finding the identification information in the storage medium with the label information.

4. The system of claim 1, wherein the transaction terminal includes another reader for reading a container radio frequency identification label on a shopping container, and wherein the transaction terminal determines that the label information is associated with the customer by reading container identification information from the container radio frequency identification label using the other reader, and finding the container identification information in the storage medium with the label information.

5. The system of claim 1, wherein the transaction terminal determines that the label information is associated with the customer by reading a transaction terminal identifier associated with the transaction terminal in the storage medium with the label information.

6. A transaction system comprising:

a stationary radio frequency identification portal, including a plurality of first radio frequency identification label readers;

a shopping container for transporting products selected for purchase by a customer and equipped with first radio frequency identification labels through the portal, wherein the shopping container includes a second radio frequency identification label;

a storage medium for storing a record identified by container identification information determined from the second radio frequency identification label, wherein the record includes label information from the first radio frequency identification labels; and a transaction terminal including a second radio frequency identification label reader for reading the second radio frequency identification label, for obtaining the label information from the record using the container identification information, for determining prices associated with the products, and for processing customer payment for the products.

7. A transaction system comprising:

a stationary radio frequency identification portal, including a plurality of radio frequency identification label readers for reading radio frequency identification labels on products selected for purchase and moved through the portal and a first card reader for reading a customer identity card;

a storage medium for storing a record identified by customer identification information determined from the customer identity card, wherein the record includes label information from the radio frequency identification labels; and a transaction terminal including a second card reader for reading the customer identity card, for obtaining the label information from the record using the customer identification information, for determining prices associated with the products, and for processing customer payment for the products.

8. A transaction system comprising:

a stationary radio frequency identification portal, including a plurality of radio frequency identification label readers for reading radio frequency identification labels on products selected for purchase and moved through the portal and an indicator for indicating a transaction terminal identifier to a customer;

a storage medium for storing a record identified by the transaction terminal identifier, wherein the record includes label information from the radio frequency identification labels; and a transaction terminal associated with the transaction terminal identifier for obtaining the label information from the record using the transaction terminal identifier, for determining prices associated with the products, and for processing customer payment for the products.

9. A transaction method comprising:

obtaining label information read from radio frequency identification labels on products selected for purchase by a customer by a plurality of radio frequency identification label readers in a stationary portal as the products are moved through the portal;

storing the label information with an identifier associating the customer with the label information in a transaction record; and providing the label information to a transaction terminal so that the transaction terminal can determine prices associated with the products and process customer payment for the products.

10. The method of claim 9, further comprising:

obtaining the identifier from a container radio frequency identification label read by the radio frequency identification label readers in the portal.

11. The method of claim 9, further comprising:

obtaining the identifier from a customer card read by a card reader of the portal.

12. The method of claim 9, further comprising:

creating the identifier and indicating the identifier to the customer through an indicator of the portal.

13. A transaction system comprising:

a stationary radio frequency identification portal, including a plurality of readers for reading radio frequency identification labels on products selected for purchase by customers and moved through the portal;

a storage medium for storing label information from the radio frequency identification labels read by the radio frequency identification label readers; and a number of transaction terminals for determining that the label information is associated with the customers, for obtaining the label information from the storage medium, for determining prices associated with the products using the label information, and for processing customer payment for the products;

wherein the number of transaction terminals associated with the one portal is large enough to complete nearly all customer transactions without requiring customers to wait for an open transaction terminal.

14. The system of claim 13, wherein the number is about eight to twelve.

15. The system of claim 13, wherein the number is as high as about sixteen.

16. A transaction system comprising:

a computer for obtaining label information read from radio frequency identification labels on products selected for purchase by a customer by a plurality of radio frequency identification label readers in a stationary portal as the products are moved through the portal, for storing the label information with an identifier associating the customer with the label information in a transaction record, and for providing the label information to a transaction terminal so that the transaction terminal can determine prices associated with the products and process customer payment for the products.

* * * * *